(12) United States Patent
Schmittat

(10) Patent No.: US 10,043,440 B2
(45) Date of Patent: Aug. 7, 2018

(54) INTERIOR DESIGN ELEMENT WITH INTEGRATED SCREEN

(71) Applicant: Lisa Draexlmaier GmbH, Vilsbiburg (DE)

(72) Inventor: Lutz Schmittat, Vilsbiburg (DE)

(73) Assignee: Lisa Draexlmaier GmbH, Vilsbiburg (DE)

(*) Notice: Subject to any disclaimer, the term of this patent is extended or adjusted under 35 U.S.C. 154(b) by 0 days.

(21) Appl. No.: 15/404,522

(22) Filed: Jan. 12, 2017

(65) Prior Publication Data

US 2017/0206831 A1    Jul. 20, 2017

(30) Foreign Application Priority Data

Jan. 14, 2016    (DE) .................... 10 2016 200 355

(51) Int. Cl.
*G06F 3/041*    (2006.01)
*G09G 3/32*    (2016.01)
(Continued)

(52) U.S. Cl.
CPC .............. *G09G 3/32* (2013.01); *B60K 35/00* (2013.01); *B60Q 3/14* (2017.02); *B60Q 3/745* (2017.02);
(Continued)

(58) Field of Classification Search
CPC .............. G09G 3/32; G09G 2320/0626; G09G 2380/10; B60R 13/02; B60R 13/0256;
(Continued)

(56) References Cited

U.S. PATENT DOCUMENTS

2002/0054440 A1*    5/2002  Akamine .............. B60K 35/00
                                                        359/893
2016/0043763 A1*    2/2016  Richter ............... H04B 1/3888
                                                        455/575.8
(Continued)

FOREIGN PATENT DOCUMENTS

DE    10 2008 037 977 A1    2/2010
EP        2 060 443 A2       5/2009
FR        3 016 145 A1      10/2015

OTHER PUBLICATIONS

Office Action in German Application No. DE 10 2016 200 355.0, dated Oct. 25, 2016.

*Primary Examiner* — Erin M File
(74) *Attorney, Agent, or Firm* — Finnegan, Henderson, Farabow, Garrett & Dunner, LLP

(57) ABSTRACT

An interior design element for a motor vehicle, comprising a carrier, a screen element, a decor layer having at least one perforated section, at least one lighting element, and a control unit coupled to the screen element and to the lighting element. The screen element and the decor layer are arranged adjacent to one another on the carrier. The perforated section borders the screen element and is penetrable with light from the lighting element. The screen element and the perforated section together form a common display surface, wherein the control unit splits up image information into information portions and activates the lighting element and the screen element such that the information portions can be displayed in the perforated section and in the screen element. The information portions displayed in the perforated section and in the screen element complement each other and in total represent the complete image information.

20 Claims, 3 Drawing Sheets

(51) Int. Cl.
*B60Q 3/14* (2017.01)
*B60K 35/00* (2006.01)
*B60R 13/02* (2006.01)
*G06F 3/043* (2006.01)
*G06F 3/044* (2006.01)
*G06F 3/01* (2006.01)
*B60Q 3/74* (2017.01)

(52) U.S. Cl.
CPC .......... *B60R 13/02* (2013.01); *B60R 13/0256* (2013.01); *G06F 3/017* (2013.01); *G06F 3/044* (2013.01); *G06F 3/0416* (2013.01); *G06F 3/0433* (2013.01); *B60K 2350/1028* (2013.01); *B60K 2350/203* (2013.01); *B60K 2350/2086* (2013.01); *B60Q 2500/10* (2013.01); *B60R 2013/0287* (2013.01); *G06F 2203/04108* (2013.01); *G09G 2320/0626* (2013.01); *G09G 2380/10* (2013.01)

(58) Field of Classification Search
CPC .. B60R 2013/0287; B60Q 3/745; B60Q 3/14; B60Q 2500/10; G06F 3/0416; G06F 3/017; G06F 3/044; G06F 3/0433; G06F 2203/04108; B60K 35/00; B60K 2350/2086; B60K 2350/203; B60K 2350/1028
See application file for complete search history.

(56) References Cited

U.S. PATENT DOCUMENTS

2016/0103512 A1* 4/2016 Edgren .................. B60K 37/06
345/173
2017/0311408 A1* 10/2017 Gawel ................ H05B 33/0872

* cited by examiner

INTERIOR DESIGN ELEMENT WITH INTEGRATED SCREEN

CROSS REFERENCE TO RELATED APPLICATIONS

This application is based upon and claims the benefit of prior German Patent Application No. DE 10 2016 200 355.0, filed on Jan. 14, 2016, the entire contents of which are incorporated herein by reference.

TECHNICAL FIELD

The present disclosure relates to an interior design element for a motor vehicle, comprising a display surface formed partly by a screen element and partly by a perforated section within a decor layer. The present disclosure also relates to a method for displaying image information on an interior design element.

BACKGROUND

Automobile interiors are increasingly using display screens. Screens in a vehicle may display information specific to the vehicle. They may also be used as universal display devices with which other content, such as navigation and entertainment content, can be displayed individually in addition to vehicle-specific parameters and information. However, prior art screens suffer various disadvantages and drawbacks. For example, the screens stand out noticeably from the interior design element due to their rectangular shape and their generally shiny, glaring surface, limiting their potential for integration into the vehicle design.

Partly covering the screen is known in the state of the art. However, one problem with the prior art is that the surface of the screen is then no longer fully available for displaying information.

For example, in FR 3 016 145 A1 a screen is described that has a visible area and a partly covered area. The visible area provides information for the driver. The partly covered area serves as indirect lighting. For this purpose the partly covered area has a diffusing disk at a light passage orifice through which light irradiated from the screen exits into the passenger space.

Furthermore, DE 10 2008 037 977 A1 discloses a display device for a vehicle with a display that is or can be mounted in the interior of the vehicle. The display device includes a lighting unit with which the area surrounding the display can be illuminated and a control device to control the illumination generated by the lighting unit.

However, disadvantages of the display device include that information can only be shown via the screen of the display device. The lighting unit merely serves to make it easier for the passenger to recognize the information shown on the screen.

SUMMARY

Embodiments of the present disclosure provide an interior design element with a screen, which offers enhanced possibilities for integration of the screen into the interior design element.

Embodiments of the present disclosure provide an interior design element according to the present disclosure for a motor vehicle comprising a carrier, a screen element, a decor layer with one or more perforated sections, at least one lighting element and a control unit coupled to the screen element and to the lighting element. The lighting element may be a first lighting element. The screen element and the decor layer are arranged on the carrier, and the perforated section of the decor layer borders the screen element.

According to embodiments of the present disclosure, both the screen element and the decor layer are arranged on a shared side of the carrier, for example in a common plane. Specifically, this side can be the side of the carrier that faces the interior of the motor vehicle. The decor layer can be non-transparent, transparent or semitransparent. For example, the decor layer can be made of leather, synthetic leather, a textile or a plastic foil. The screen element may be provided as a flat screen. In addition, the decor layer can embodied to border not only one side, but also several sides of the screen element. Thus, where applicable, it can also frame the screen element.

According to embodiments of the present disclosure, the perforated section in the decor layer can be formed by a plurality of holes. The holes may be dead-end holes or through-holes, for example. The holes can be added later to the decor layer. This can be done with techniques such as lasers, by punching, or stamping. However, the perforated section can also include pre-existing holes formed by the nature of the decor layer. For example, if a textile fabric is used for the decor layer, the holes in the perforated section could also be formed by interstices between the threads of the fabric. With the perforated section at least one area is created in the decor layer in which visible light can shine through the decor layer.

According to embodiments of the present disclosure, the perforated section is penetrable by light from the first lighting element. Therefore, the first lighting element is preferably arranged to permit the light emitted from the first lighting element to radiate toward the perforated section. The first lighting element can be arranged for this purpose directly in the perforated section on the decor layer.

According to embodiments of the present disclosure, the perforated section, which borders the screen element, serves primarily to enable a common display surface to be formed by the screen element and the perforated section. Thus, a portion of the display surface is directly formed by the screen element, and an additional portion of the display surface is formed by the perforated section, since light from the first lighting element can shine through it. To create the shared display surface the control unit subdivides image information to be shown on the display surface into a first information portion and a second information portion, and activates the lighting element and the screen element such that the first information portion can be displayed in the perforated section and the second information portion in the screen element. The information portions in the perforated section and in the screen element complement each other and, in total, represent the complete image information. Particularly in the perforated section, the first information portion can be depicted in the form of light signals by the first lighting element. The light signals then shine through the perforated section and become visible as the corresponding first information portion on the perforated section. On activating the first lighting element, the control unit can take a correction factor into consideration, with the aid of which, for example, the influence that the holes in the perforated section have on the first information portion or its light signals can be corrected.

According to embodiments of the present disclosure, the control unit can activate the first lighting element and the screen element to display image information in the perforated section only, in the screen element only, or partly in the screen element and partly in the perforated section.

Embodiments of the present disclosure provide an interior design element for a motor vehicle, comprising a carrier; a screen element arranged on the carrier; a decor layer arranged on the carrier having a perforated section, the perforated section bordering the screen element and forming a common display surface with the screen element; a lighting element arranged beneath the perforated section and configured to emit light through the perforated section; and a control unit coupled to the screen element and the lighting element, wherein the control unit is configured to divide image information into a first information portion and a second information portion; and activate the lighting element and the screen element to display the first information portion in the perforated section and display the second information portion in the screen element, wherein the displayed first and second information portions complement each other and together represent the image information.

According to embodiments of the present disclosure, the image information can be stored in a storage device before it is divided. After the image information has been divided into information portions by the control unit, these information portions can be deposited either on a shared storage device or on separate storage devices. If the information portions are deposited on separate storage devices, the information portion that is earmarked for display on the screen element may be stored on a first separate storage device and the information that is intended for display in the perforated area is stored in a second separate storage device. The image information or the information portions can be loaded from the storage devices by the control unit.

According to embodiments of the present disclosure, the term "image information" refers to that portion of knowledge that the viewer of the display surface can visually perceive. For example, the image information or information portions can be generated on the display surface through one or more luminous areas which, for instance, are highlighted by one or more light colors and/or at least one light intensity and/or a defined contour on the display surface. Thus, this does not merely entail a simple illumination that the viewer can perceive. Rather, the viewer may combine that which is visually perceived with a certain knowledge or acquires that knowledge by observing the luminous areas. The luminous areas in the perforated section in particular can be partitioned by the decor layer into luminous subareas. The image information can be presented by physical data which provides the vehicle occupants with information relevant to the vehicle or to the route, such as the course of the road or speed limits.

According to embodiments of the present disclosure, a display surface is extended into the decor of the interior design element. The display surface may enhance the possibilities for integration of the screen element, and provide a smooth transition between decor and screen element.

According to embodiments of the present disclosure, to further increase the functionality of the interior design element, a touch-sensitive touch panel at least by sections on the display surface is provided. This touch panel is coupled to the control unit such that when the display surface is touched, a touch location and/or a direction of movement of a dynamic touch on the display surface, particularly including the area inside the perforated section, can be detected by the control unit with the aid of the touch panel. Thus , the touch panel may extend not only across the screen element, but also across the perforated section. To this end, the touch panel can be embodied to extend across the screen element and the perforated section.

According to embodiments of the present disclosure, the touch panel includes two or more tactile elements. The first tactile element may be arranged on the perforated section while the second tactile element may be arranged on the screen element, with both tactile elements together forming the touch panel.

According to embodiments of the present disclosure, an input field can be created using the touch panel. As a result, not only can image information be output with the aid of the display surface, but the viewer can also interact with the image information.

According to embodiments of the present disclosure, the control unit matches the touch location or direction of movement of a dynamic touch with a position of the image information on the display surface. This enables the control unit to detect when an item of image information has been touched, for example. This gives the viewer the opportunity to interact with the displayed image information. For example, if the image information displayed is a control element and the control unit detects a touch at a touch location corresponding to the position of the control element on the display surface, the control unit can recognize that the viewer wishes to operate the control element shown. The corresponding operation to be performed can be conducted either by the control unit itself or, as alternatively, a signal can be transmitted by the control unit to the board electronics, indicating that a corresponding control element has been activated.

According to embodiments of the present disclosure, in the perforated section the touch panel can be located either on the decor layer, i.e. on a side of the decor layer facing the interior space, or between the carrier and the decor layer. As an alternative, the touch panel can also be located on a side of the carrier facing away from the decor layer. In addition, the touch panel can be located on the screen element, i.e. facing the interior space, or between the screen element and the carrier. Here, too, it is contemplated that the touch panel may be located on a side of the carrier facing away from the screen element.

According to embodiments of the present disclosure, the touch panel can include a piezoelectric or capacitive sensor element. Both capacitive and piezoelectric sensor elements, due to their availability in small sizes, may enable the required installation space of the touch panel to increase only slightly. At the same time, a capacitive sensor element in particular may allow a user to interact with the screen without necessarily having to touch the display surface. It may be sufficient here for the user to hold a finger very close to the display surface. Accordingly, a capacitive sensor element may be used particularly if the touch panel is arranged on a side of the carrier that faces away from the screen element and the perforated section. Although in this case the viewer does not actually touch the touch panel itself, the corresponding touch on the display surface can still be detected.

According to embodiments of the present disclosure, the touch panel includes a special transparent foil. Since piezoelectric and capacitive sensor elements in particular can be provided in a virtually transparent form, a transparent foil may serve as the substrate for these sensor elements and the touch panel may include a transparent foil of this type. This may simplify handling of the touch panel. Further, the image information shown in the perforated section and in the screen element is not affected or distorted by the touch panel, insofar as the touch panel is located on the perforated section and/or the screen element.

According to embodiments of the present disclosure, the first lighting element has several points of light that can be controlled individually by the control unit in order for the first information portion to be depicted in the perforated section. The number of light points can correspond to the number of perforations. For instance, it is contemplated to have one light point on the first lighting element for each perforation hole provided. However, it is also contemplated for one perforation hole to have several light points shining through it, with the result that the number of light points is in a defined relationship to the number of holes in the perforated section. This enables the light from several light points in a hole to overlap, making it possible to more precisely adjust the desired color of the light to be perceived by the viewer.

According to embodiments of the present disclosure, one light point may shine through a plurality of holes in the perforated section. Due to the low number of light points to be activated, the cost of the first lighting unit could be reduced.

According to embodiments of the present disclosure, the first lighting element may have a lower number of light points than the screen element. Since the first lighting element is covered from the viewer's perspective by the decor layer, it is possible to select a lower resolution of the display surface in the perforated section than in the screen element. This can lower the cost of the entire arrangement, since a less expensive alternative to a high-resolution screen element can be selected in the perforated section. For example, if a low resolution is desired, the light points can also be provided from punctiform light sources, especially light emitting diodes (LEDs) or organic light emitting diodes (OLEDs).

According to embodiments of the present disclosure, additional partitions can be provided between the punctiform light sources to divide the first lighting element into sections. With the partitions it is possible to ensure that the light from the light sources does not overlap and that the information portions depicted remain recognizable.

According to embodiments of the present disclosure, the interior design element can have at least a second lighting element arranged at an angle to the first lighting element and having a direction of emission extending substantially parallel to the decor layer. The second lighting element, for instance, can include an LED or OLED and may have a punctiform or strip-like shape. It may have a maximum light intensity that is lower than the maximum light intensity of the first lighting element, with the result that even when the second lighting element is switched on, the first information portion generated by the first lighting element is still visible. Here, "substantially parallel" is intended to describe an angle of between −15 and +15 degrees that stretches between a plane defined by the decor layer and a main emitting direction of the second lighting element. With the aid of the second lighting element it is possible to backlight the perforated section over a large area. The second lighting element may be arranged adjacent to the perforated section and have a direction of emission extending along the perforated section.

According to embodiments of the present disclosure, to ensure that the decor layer maintains adequate stability particularly in the perforated section, the carrier may be made of a material that is at least partly transparent and that is arranged between the first lighting element and the decor layer. In this case, the first lighting element can be located on a side of the carrier facing away from the decor layer, and it can radiate through the carrier in the direction of the perforated section. The decor layer in this case is adequately strong and sturdy, and at the same time the desired light penetration through the perforated section can be ensured.

According to embodiments of the present disclosure, the decor layer has holes in the perforated section with a diameter of 0.01 to 3 mm. Within this range it can be ensured that the holes, insofar as they are not backlit by the first lighting element, are not visible or only barely visible to a viewer. By the same token, however, the holes are large enough in diameter to ensure that in the case of backlighting the image information or the information portions can be recognized. In some embodiments, holes are spaced apart by 0.1 to 3 mm. Moreover, the decor layer can have a thickness of 0.15 to 2 mm. In this way, for example, it is possible to avoid letting perception of the first information portion in the perforated section depend on the viewing angle.

According to embodiments of the present disclosure, the diameter of the holes decreases as the distance from the screen element increases. This makes it easier to recognize where the boundaries of the display surface are located. The number and/or arrangement of the light points formed by the first lighting element can likewise be adjusted here to the decreasing diameter of the holes.

According to embodiments of the present disclosure, to ensure that the holes are not soiled by external factors, they can be filled at least partly with a transparent filler material. For example, the holes can be at least partly filled by a foil that is applied to the decor layer at least in sections and becomes partly embedded in the holes.

Embodiments of the present disclosure also provide a method of operating an interior design element according to the present disclosure in a motor vehicle. The method includes the following steps:

uploading image information into the control unit;

dividing up the image information into a first information portion and a second information portion by the control unit; and displaying the first information portion in the perforated section and the second information portion in the screen element in that the control unit activates the screen element and the lighting element, wherein the information portions in the perforated section and in the screen element complement each other and in total represent the complete image information.

According to embodiments of the present disclosure, before or during the step of uploading, the control unit detects an input signal from a touch-sensitive touch panel arranged in the area of the screen element and/or of the perforated section. This can influence the image information to be displayed, both in position and in content, as a function of user input gathered via the touch panel.

Embodiments of the present disclosure provide a method of operating an interior design element of a motor vehicle, the interior design element comprising a carrier, a screen element arranged on the carrier, a decor layer arranged on the carrier and having a perforated section bordering the screen element and forming a common display surface with the screen element, a lighting element configured to emit light through the perforated section, and a control unit coupled to the screen element and the lighting element, the method comprising the following steps performed by the control unit: receiving image information; dividing the image information into a first information portion and a second information portion; and activating the lighting element and the screen element to display the first information portion in the perforated section and display the second information portion in the screen element, wherein the displayed first and second information portions complement each other and together represent the image information.

The described properties of the present disclosure and the manner in which these are achieved will be described in more detail based on the following detailed description. The foregoing general description and the following detailed description are exemplary and explanatory only, and are not restrictive of embodiments consistent with the present disclosure. Further, the accompanying drawings illustrate embodiments of the present disclosure, and together with the description, serve to explain principles of the present disclosure.

DETAILED DESCRIPTION

Figure 1:
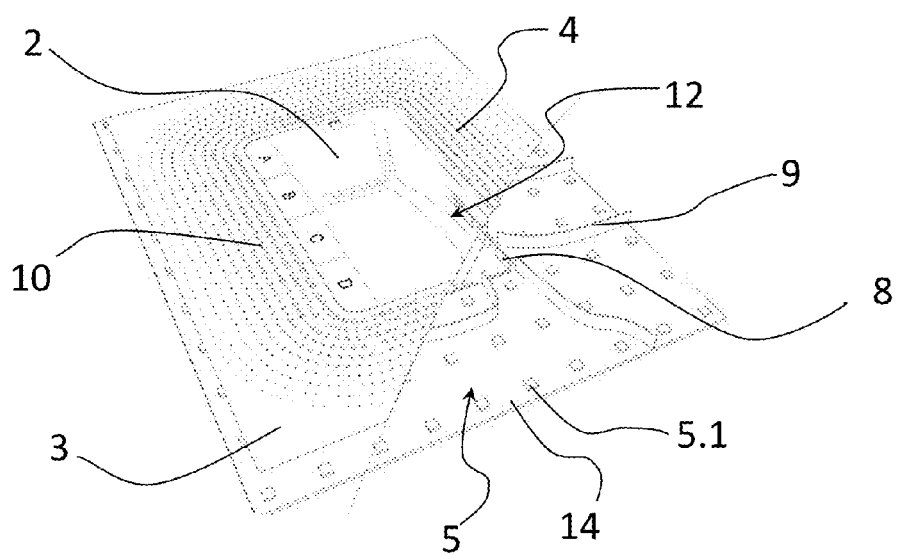
FIG. 1 shows a three-dimensional view of a section of an exemplary interior design element according to the present disclosure.

FIG. 1 shows a three-dimensional view of a section of an interior design element according to the present disclosure. The interior design element comprises a decor layer 3 and a screen element 2. The screen element 2 and the decor layer 3 form the visible side of the interior design element, in which the screen element borders the decorative part 3. In the present embodiment the screen element 2 is a flat-panel display and the decor layer 3 is made of leather. A plurality of holes 10 have been made in the decor layer 3, thereby forming a perforated section 4. The perforated section 4 here is positioned to border the screen element 2 and forms a sort of ring around the screen element. Both the screen element 2 and the decor layer 3 are mounted on a carrier (shown in FIG. 4). However, in the present embodiment the carrier has been removed to ensure the clarity of the drawing. The holes may be filled at least partially with a transparent filler material 19 (shown in FIG. 3).

A first lighting element 5 is located underneath the perforated section 4. As in the case of the perforated section 4, the lighting element 5 wraps around the screen element 2. The first lighting element 5 in the present embodiment is provided as a plurality of punctiform light sources 5.1 (i.e. in the shape of a point) arranged on a carrier plate 14. The punctiform light sources 5.1 are RGB LEDs. The RGB LEDs can be activated independently of one another by a control unit (not shown in FIG. 1). Partitions 9 are provided between the punctiform light sources 5.1. The partitions 9 divide the first lighting element 5.1 into sections. This can prevent the light emitted from the punctiform light sources 5.1 from excessively overlapping before reaching the perforated section 4.

In addition, a second lighting element 8 is arranged on the interior design element, substantially at right angles to the decor layer 3. The second lighting element 8 borders the screen element 2 and radiates parallel to the decor layer 3, away from the screen element 2 In this manner, a soft illumination of the perforated section 4 over a broad area can be provided with the aid of the second lighting element 8. To ensure that the broad illumination is not impeded by the partitions 9, the partitions 9 can have transparent sections, for example, or they can have a height selected to maintain a gap between the partition 9 and the decor layer 3.

A control unit (not shown), that is coupled to the first lighting element 5 and to the screen element 2, controls a display surface 12 composed partly of the perforated section 4 and partly of the screen element 2. Image information 11 to be displayed is divided by the control unit into a first and a second information portion 11.1, 11.2. The first information portion 11.1 can then be displayed in the perforated section 4 with the aid of the first lighting element 5 and the second information portion 11.2 can be displayed in the screen element 2.

Figure 2:
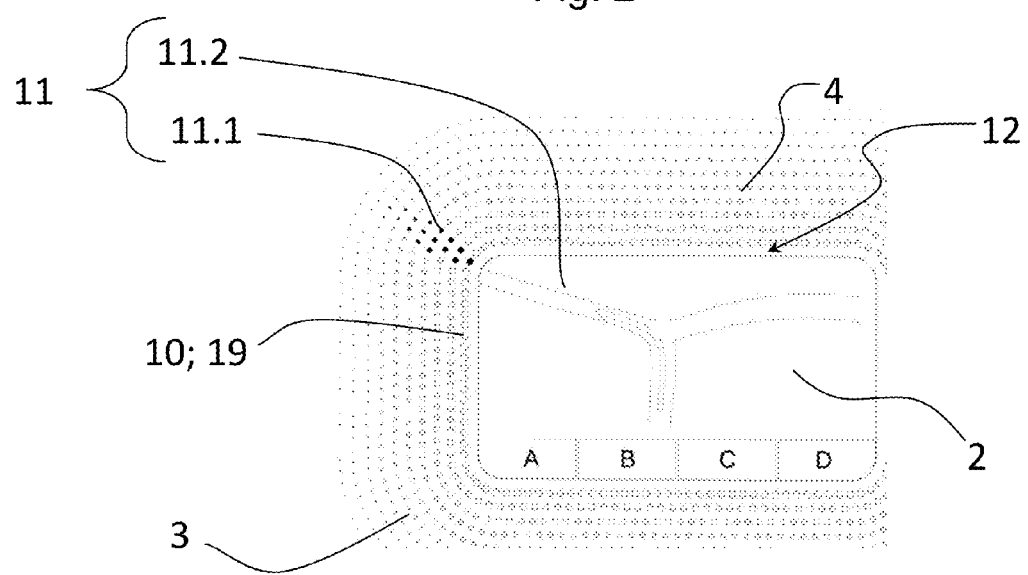
FIG. 2 shows a plan view of the embodiment according to the present disclosure of the interior design element shown in FIG. 1.

In this way, for example, a portion of the image information 11 in the perforated section 4 and an additional portion in the screen element 2 may be displayed. An example of this is shown in FIG. 2, which depicts a plan view of the embodiment according to the present disclosure as shown in FIG. 1. A second information portion 11.2, which a viewer may interpret as a roadmap for navigation, is provided by the screen element 2. A first information portion 11.1 is additionally displayed in the perforated section, representing the continued course of the road into which the vehicle will presumably travel. Furthermore, the course of the road, where applicable, is displayed in a color that differs from that of the normal route. This may indicate to the viewer the current traffic situation, for example, indicating a traffic jam. In the present example, the image information 11 relating to the road is thus displayed not only by the perforated section 4, but also by the screen element 2. The decor layer 3 in the perforated section 4 is part of the display surface 12 that is observed by the viewer. The two information portions 11.1, 11.2 displayed together form the image information 11 that is presented to the viewer. The information portions 11.1, 11.2 are shown as luminous areas on the display surface 12.

Figure 3:
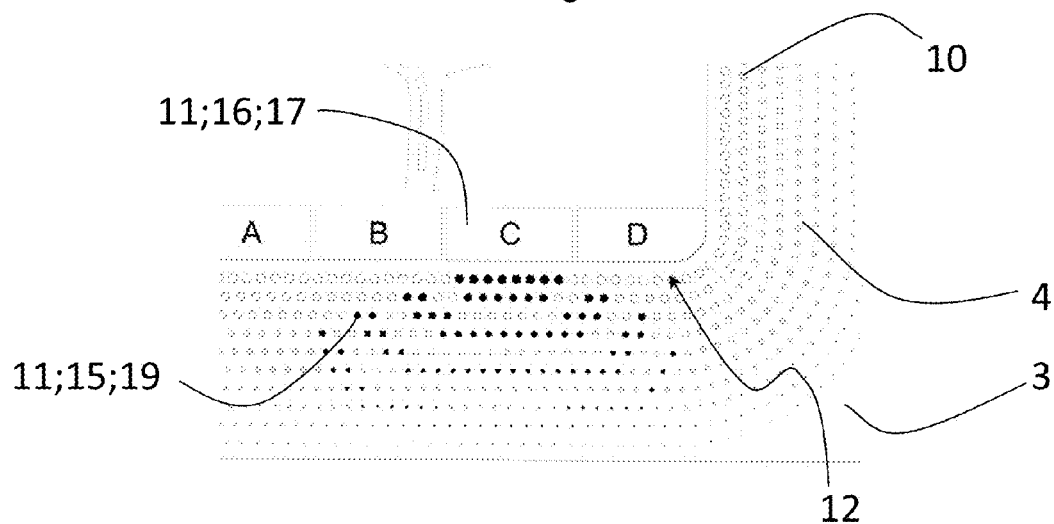
FIG. 3 shows another plan view of an interior design element according to the present disclosure in the embodiments shown in FIGS. 1 and 2.

FIG. 3 shows a plan view of the interior design element according to the present disclosure as shown in FIGS. 1 and 2, in another section of the display surface 12. In contrast to FIG. 2, in the perforated section 4 additional image information 11 is generated that does not extend into the screen element 2, and yet there is a connection with the image information 11 in the screen element 2. For example, in the screen element 2 image information 11 is generated which the viewer interprets as being the letter "C", while the image information 11 produced in the perforated section 4 is a dynamic running light that signals to the viewer that, for example, the image information 11 "letter C" has been selected.

As shown in FIG. 3, the holes may be filled at least partially with a transparent filler material 19. This may reduce dirt, debris, or other materials from collecting in the holes. Further, the first and the second information portions 11.1, 11.2 may be generated by one or more luminous areas 15, 16 set apart from the display surface 12 by one or more light colors 17, 18 and/or at least one light intensity and/or a defined contour. For example, the perforated section 4 may include a first luminous area 15 configured to display the first information portion 11.1, and the screen element 2 may include a second luminous area 16 configured to display the second information portion 11.2. The displayed first and second information portions 11.1, 11.2 may be distinguished from the display surface 12 by at least one of light color, light intensity, or defined contour.

Figure 4:
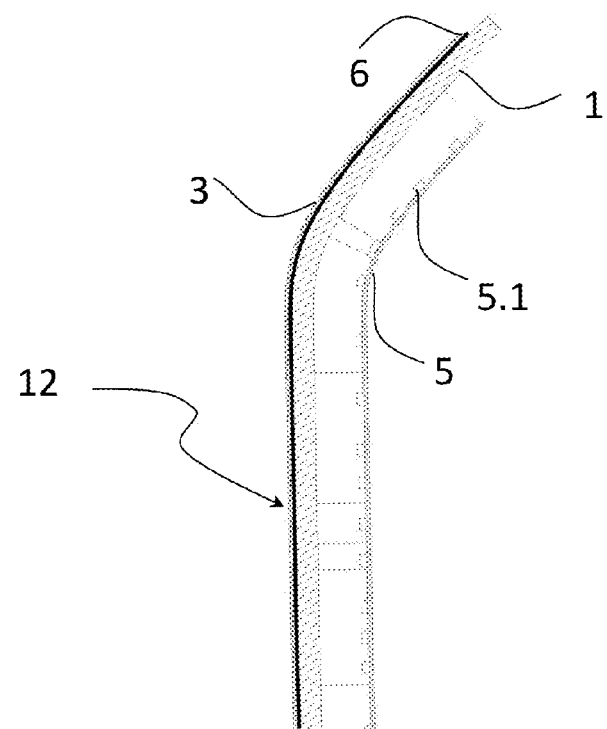
FIG. 4 shows a sectional view of a perforated section of an interior design element according to the present disclosure.

FIG. 4 shows a cross-section of an interior design element according to the present disclosure. Here a section was selected in which the perforated section is arranged in the decor layer 3. The carrier 1 is arranged between the first lighting element 5 and the decor layer 3. The carrier 1 in the present embodiment is made of polycarbonate and is transparent, such that light emitted by the first lighting element 5 can radiate through the carrier 1 and reach the decor layer 3. Furthermore, a touch panel 6 in the form of a touch-sensitive transparent foil is arranged between the decor layer 3 and the carrier 1. Capacitive sensor elements are arranged on the foil, registering when a viewer touches the perforated section 4, for example. These registered movements can be relayed to the control unit (not shown), so that the display surface 12 can be used at the same time as the input field.

Figure 5:
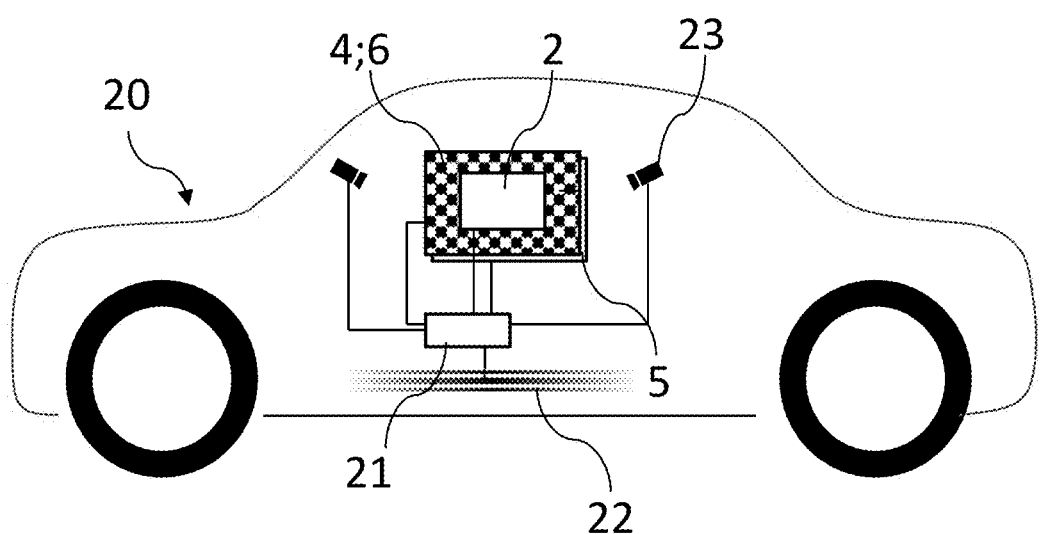
FIG. 5 shows a schematic view of a motor vehicle with integrated interior design element according to the present disclosure.

FIG. 5 shows a schematic view of a motor vehicle 20 in the form of an automobile, with an integrated interior design element according to the present disclosure. In the present embodiment a control unit 21 is coupled to a board network 22 of a vehicle 20 via cables, thereby enabling vehicle-specific data to be gathered and processed by the control unit 21. The interior design element according to the present disclosure possesses two optical sensor elements 23 as an additional operating element in the form of cameras through which passengers' gestures can be detected. The recognized gestures can be transmitted to the control unit and serve as an input signal for creating or modifying image information 11.

Figure 6:
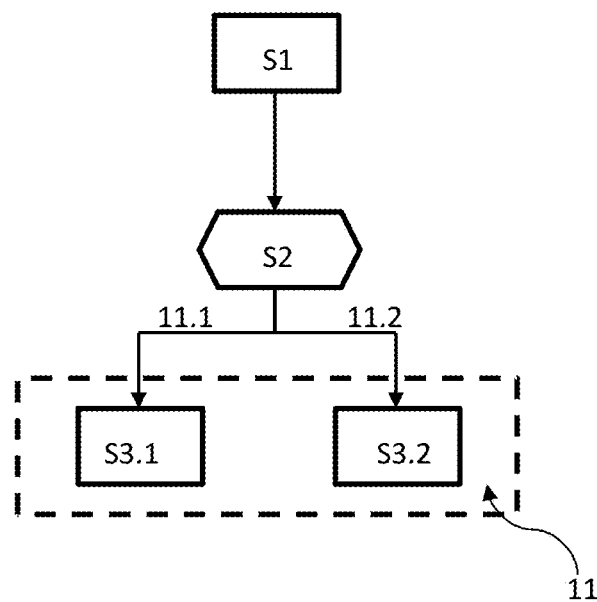
FIG. 6 shows a flowchart of a method of displaying image information in accordance with the present disclosure.

FIG. 6 shows a flowchart of a method according to the present disclosure for displaying image information 11 in an interior design element of the present disclosure. The method begins with step S1, uploading image information 11 to be displayed into the control unit 21. The image information 11 here can be made available, for example, by an entertainment system or a navigation system connected to the control unit 21. In addition to the information to be displayed, the image information also includes local parameters with which the control unit 21 can determine the exact position of the image information 11 on the display surface. Step S2 is performed after step S1 and encompasses the distribution of the image information 11. During the distribution, the control unit 21 subdivides the image information 11 into a first and a second information portion 11.1, 11.2. The first information portion 11.1 serves for displaying a portion of the image information 11 in the perforated section 4, while the second information portion 11.2 serves for displaying a portion of the image information 11 in the screen element 2. The exact distribution depends on where the image information 11 to be generated is intended to be displayed on the display surface and in what proportions the image information 11 is positioned in the perforated section and in the screen element.

Finally, step S2 is followed by steps S3.1 and S3.2, in which step S3.1 includes displaying the first information portion 11.1 in the perforated section 4 and S3.2 encompasses displaying the information portion 11.2 in the perforated section 4. The control unit 21 controls the screen element 2 or the lighting element 5 accordingly, in order to display the particular information portion 11.1, 11.2 on the perforated section 4 or the screen element 2, respectively.

Thus, the information portions 11.1, 11.2 are presented separately to the viewer, who may perceive the complete image information 11 through the combination of information portions 11.1, 11.2.

Embodiments of the present disclosure may be implemented with computer-executable instructions. Various operations or functions are described herein, which may be implemented or defined as software code or computer-executable instructions. Such content may be directly executable, source code, or difference code. A machine or computer readable storage medium may cause a machine to perform the functions or operations described, and includes any mechanism that stores information in a form accessible by a machine (e.g., computing device, control unit, and the like), such as recordable/non-recordable media (e.g., read only memory (ROM), random access memory (RAM), magnetic disk storage media, optical storage media, flash memory devices, and the like).

Having described aspects of the present disclosure in detail, it will be apparent that modifications and variations are possible without departing from the scope of aspects of the present disclosure as defined in the appended claims. As various changes could be made in the embodiments described without departing from the scope of aspects of the present disclosure, it is intended that all matter contained in the above description and shown in the accompanying drawings shall be interpreted as illustrative and not in a limiting sense.

LIST OF REFERENCE NUMBERS

1 carrier
2 screen element
3 decor layer
4 perforated section
5 (first) lighting element
5.1 light source
6 touch panel
8 second lighting element
9 partition
10 hole
11 image information
11.1 information portion
11.2 information portion
12 display surface
14 carrier plate
15 luminous area
16 luminous area
17 light color
19 transparent filler material
20 motor vehicle
21 control unit
22 board network
23 optical sensor element

What is claimed is:

1. An interior design element for a motor vehicle, comprising:
    a carrier;
    a screen element arranged on the carrier;
    a decor layer arranged on the carrier and having a perforated section, the perforated section bordering a perimeter of the screen element, wherein the screen element is separate from the perforated section, and wherein the perforated section and the screen element are associated with a common display surface;

a lighting element arranged beneath the perforated section and configured to emit light through the perforated section; and a control unit coupled to the screen element and the lighting element, wherein the control unit has at least one processor coupled to a storage medium storing instructions that, when executed, configure the processor to:

divide image information into a first information portion and a second information portion; and activate the lighting element and the screen element to display the first information portion in the perforated section and display the second information portion in the screen element, wherein the displayed first and second information portions complement each other and together represent the image information.

2. The interior design element according to claim 1, wherein the perforated section comprises a first luminous area configured to display the first information portion and the screen element comprises a second luminous area configured to display the second information portion, the displayed first and second information portions being distinguished on the common display surface by at least one of light color, light intensity, or defined contour.

3. The interior design element according to claim 1, further comprising:

a touch panel arranged on the common display surface formed by the screen element and the perforated section, the touch panel being coupled to the control unit and configured to send touch location information to the control unit in response to a detected touch;

wherein the control unit is coupled to the touch panel and the instructions configure the processor to:

determine a touch location on the display surface based on the received touch location information.

4. The interior design element according to claim 3, wherein the instructions configure the processor to match the determined touch location with a position of the image information on the display surface.

5. The interior design element according to claim 3, wherein the touch panel comprises at least one of a piezoelectric or a capacitive sensor element.

6. The interior design element according to claim 5, wherein the touch panel comprises a transparent foil and the at least one sensor element is mounted on the transparent foil.

7. The interior design element according to claim 1, wherein the lighting element comprises a plurality of light points independently controllable by the control unit.

8. The interior design element according to claim 7, wherein the screen element comprises a display screen having a first display resolution, and the lighting element comprises a plurality of light points associated with a second display resolution, the second display resolution being less than the first display resolution.

9. The interior design element according to claim 7, wherein the light points are punctiform light sources.

10. The interior design element according to claim 9, wherein the punctiform light sources are at least one of light emitting diodes (LEDs) or organic light emitting diodes (OLEDs).

11. The interior design element according to claim 9, further comprising:

partitions arranged between the punctiform light sources to divide the lighting element into sections.

12. The interior design element according to claim 1, further comprising:

a second lighting element arranged at an angle to the first lighting element and having a direction of emission extending substantially parallel to the decor layer.

13. The interior design element according to claim 12, wherein the second lighting element has a maximum light intensity that is lower than a maximum light intensity of the first lighting element.

14. The interior design element according to claim 1, wherein the carrier comprises an at least partially transparent material and is arranged between the lighting element and the decor layer.

15. The interior design element according to claim 1, wherein the perforated section includes holes with a diameter of 0.01 to 3 mm.

16. The interior design element according to claim 15, wherein the diameter of the holes decreases as the distance from the screen element to the hole increases.

17. The interior design element according to claim 16, wherein the holes are filled with a partially transparent filler material.

18. A device for displaying information in a motor vehicle, comprising:

a carrier having a carrier plate and a side facing the interior of the vehicle;

a screen element mounted on the carrier side facing the interior of the vehicle;

a decor layer mounted on the carrier side facing the interior of the vehicle, the decor layer comprising a perforated section surrounding the screen element, wherein the screen element is separate from the perforated section, and wherein the perforated section and the screen element are associated with a common display surface;

a lighting element mounted on the carrier plate beneath the perforated section, surrounding the screen element, and configured to emit light through the perforated section; and a control unit electronically coupled to the screen element and the lighting element, the control unit including at least one processor coupled to a storage medium storing instructions that, when executed, configure the processor to:

receive image information;

determine a first information portion and a second information portion based on the received image information; and activate the lighting element and the screen element to display the first information portion in the perforated section and display the second information portion in the screen element, such that the displayed first and second information portions complement each other and together represent the image information.

19. The device according to claim 18, wherein the lighting element comprises a plurality of light points independently controllable by the control unit.

20. The device according to claim 19, wherein the screen element comprises a display screen having a first display resolution, and the lighting element comprises a plurality of light points associated with a second display resolution, the second display resolution being less than the first display resolution.

* * * * *